C. A. PETTIE.
PROTECTOR FOR TIRES.
APPLICATION FILED MAR. 11, 1907.
1,111,404.
Patented Sept. 22, 1914.
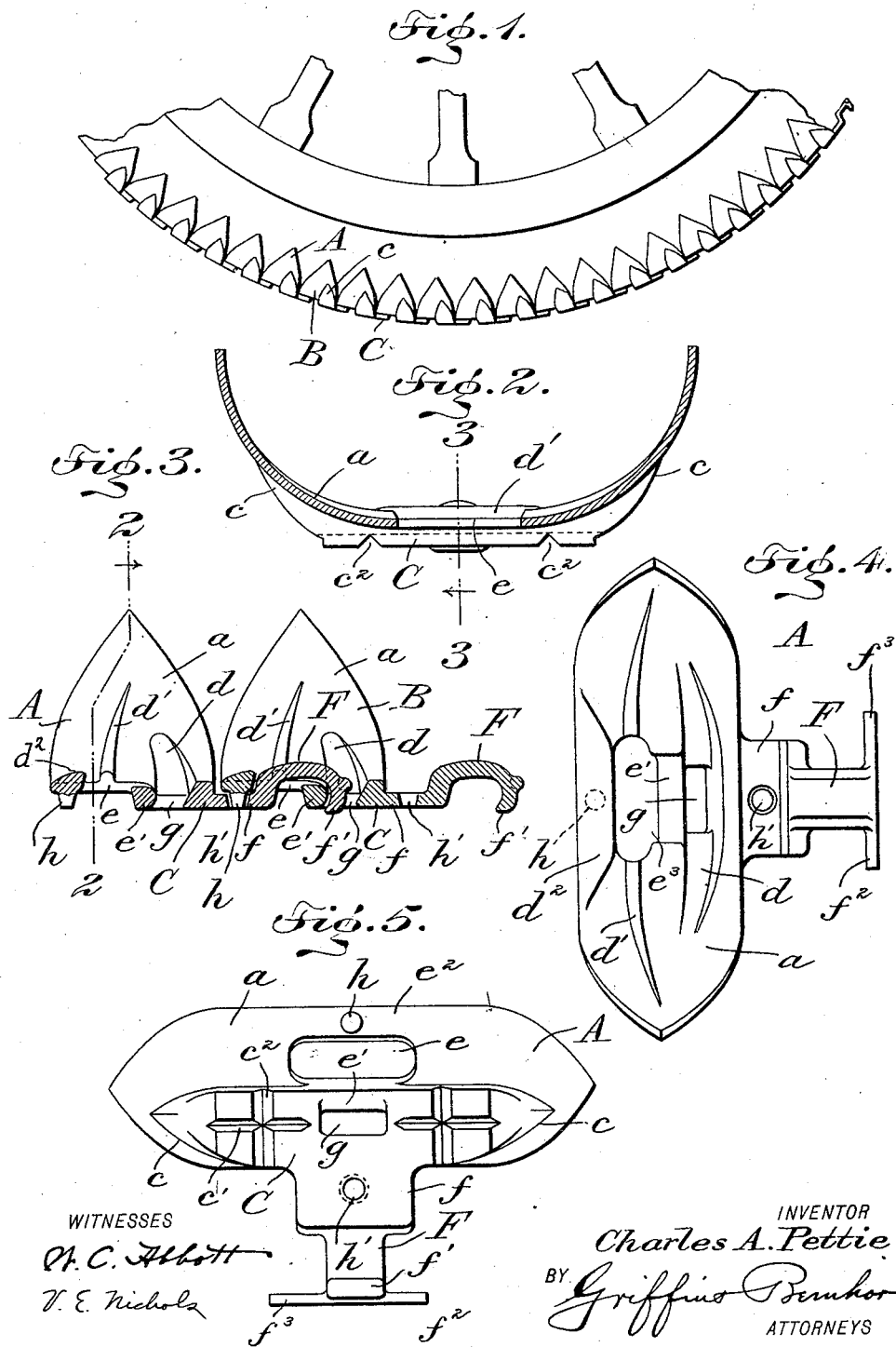
WITNESSES
A. C. Abbott
V. E. Nichols
INVENTOR
Charles A. Pettie
BY Griffin Bernhard
ATTORNEYS

UNITED STATES PATENT OFFICE.

CHARLES A. PETTIE, OF NEW YORK, N. Y.

PROTECTOR FOR TIRES.

1,111,404.  Specification of Letters Patent.  Patented Sept. 22, 1914.

Application filed March 11, 1907. Serial No. 361,696.

*To all whom it may concern:*

Be it known that I, CHARLES A. PETTIE, a citizen of the United States, residing at the city of New York, borough of Brooklyn, and State of New York, have invented a certain new and useful Protector for Tires, of which the following is a specification.

This invention is a protector for tires, the same being especially adapted for use on the inflatable tires of automobiles, although said protector may be used on the tires of vehicles, generally.

The object of the invention is to protect tires of any kind from cutting or puncturing by glass, nails or any other objects which they may meet.

Another object is to overcome the tendency of the tire to slip or "skid" over a muddy pavement, or on a sleet covered road, said protector tending to increase the traction between the wheel and the surface on which it rolls.

The protector of this invention is applied to a tire of a vehicle wheel easily, quickly, with a minimum amount of labor, and without requiring the use of tools. Said protector cannot become displaced on, or detached accidentally from, a wheel tire; and at the same time the protector is capable of a certain flexure in the direction of its length and crosswise of the tire tread, which flexure of the protector is advantageous in applying the device on a tire, and in the use of the wheel in passing around corners or when turning curves in a road. An important advantage of the protector is that it has a traction surface which effectually overcomes the tendency of a tire to slip on a muddy or sleet covered road, it being preferred to provide each section or member with means whereby it has at least three points of bearing. A further advantage is that in my preferred construction each section or member is self contained, that is, the member is constructed for engagement with other members of like construction, in order that a required number may be coupled in series without the use of other fasteners and does not require special, or even ordinary, tools.

In the accompanying drawings, I have illustrated one practical embodiment of the invention, but the construction shown therein is to be understood as illustrative only, and not as defining the limits of the invention.

Figure 1 is a side elevation of a portion of a vehicle tire with my protector applied thereto. Fig. 2 is an enlarged sectional view of one member of the protector, the plane of the section being indicated by the dotted line 2—2 in Fig. 3 looking in the direction of the arrow. Fig. 3 is a vertical longitudinal section through a portion of the protector, on the line 3—3 of Fig. 2, showing the means employed for connecting two of said members flexibly together. Fig. 4 is an inverted or bottom plan view of one of the members, illustrating the construction of the inner or non-wearing surface thereof. Fig. 5 is a plan view of the member illustrating the outer or tread surface thereof.

My protector is composed of a number of members connected detachably and flexibly one to the other, said members being constructed or fashioned for the purpose of fitting snugly to the external or tread surface of a tire. For the purpose of explaining the construction and mode of operation, I have shown two of said members at, A, B, in Fig. 3 of the drawings, but it will be understood that the required number of said members to embrace the circumference of the tire are to be employed in the full sized practical protector. Each member is, preferably, made or composed of a single piece of hard material, and in one practical embodiment of the invention the member is adapted to be cast in a single piece of metal, or a suitable alloy of metals, although I would have it understood that the metallic member may be produced by the drop forging or pressing operations, well known to the art.

The members composing the protector are duplicates one of the other, so that a detail description of one member will answer equally for the other members. Said member consists of a body portion, *a*, which is curved lengthwise to substantially or approximately the arc of the tire tread, as shown in Fig. 2. On its outer surface the member is curved at the end portions and flattened somewhat at its middle portion. The member is provided with an integral rib or tread, C, which extends lengthwise with respect to the member and projects outwardly from the surface of the body, $a$. The exposed wear or tread surface of the rib is flattened, and the end portions of the rib are tapered, as at $c$, said rib tending to thicken the metal of the body portion, $a$. The rib is roughened or corrugated in any suitable way so as to increase the traction of the member in contact with the surface of a pavement or roadway, and on its outer face said rib is shown as having transverse and longitudinal grooves, $c'$, $c^2$, which intersect one with the other.

On the inner surface of the member which comes next to the tire, said member is provided with a longitudinal groove or channel, $d$, the latter being directly opposite to the thickened rib, C. The member is provided, further, on its inner surface with reinforcing webs, $d'$, extending lengthwise thereof, and close to one side edge of said member is a lip, $d^2$, the latter being, also, on the under side of the member, see Fig. 4.

The members, A, B, are adapted to be coupled flexibly one to the other at their side edges, and although various devices may be employed for connecting said members in series, it is preferred to construct the members with means integral therewith for connecting them in the specified manner. Each member is shown as having a slot, $e$, near one side thereof, and from the other side of the member extends a coupling hook, F. The slot, $e$, is between the rib, C, and one edge of the member so as to produce two bars, $e'$, $e^2$, one of which bars is a coupling bar integral with the member, said slot, $e$, being formed with a contracted portion or throat, $e^3$, shown in Fig. 4. The coupling hook, F, is provided with a shank, $f$, said shank joining the hook with the ribbed portion, C, of the member. As shown in Fig. 3, the shank, $f$, is straight between the hook and the body of said member, and, furthermore the exposed surface of the shank is flush with the similar wear surface of the rib, C. The hook terminates at its free end in a beak, $f$, the width of said beak being less than the width of the shank, $f$, as shown in Figs. 4 and 5, the extremity of said beak extending slightly beyond the plane of the exposed surface of the shank, $f$, and the rib, C. The hook is, furthermore, provided with prongs, $f^2$, $f^3$, which are integral with the beak and extend from the opposite side edges thereof. It is preferred to have one prong shorter than the other, and in the drawings I have shown the prong, $f^2$, not quite as long as the other prong, $f^3$. The member is provided in addition to the slot, $e$, in the body portion, $a$, with another longitudinal slot, $g$, the latter being formed in the rib, C, and opening into the channel, $d$, on the inner side of the member, as shown in Fig. 4. Said slot, $g$, is narrower and shorter than the slot, $e$, and the axes of the two slots are parallel. The coupling bar, $e'$, is between the slots, $e$, $g$. Furthermore, it is preferred to employ a stud, $h$, and an aperture, $h'$. The stud is integral with the side bar, $e^2$, of the member, and it extends outwardly therefrom so that its outer portion is substantially flush with the rib, C, and the shank, $f$. The aperture, $h'$, is formed in the shank, $f$, and it is located at the point where it will receive the stud on an adjacent member when the two members are coupled together as contemplated by this invention.

The described construction of the coupling means enables the members to be connected easily and quickly without the employment of any tools whatever, and when connected said members are free to have a limited sidewise movement, as well as a limited rocking or twisting movement, without, however, permitting the members to separate accidentally.

In order to couple two members, one of them is turned edgewise with reference to the other, and the hook, F, is manipulated so that its prongs, $f^2$, $f^3$, will pass through the slot, $e$, of the other member, after which the hook is thrust through the slot, $e$, and the two members are brought into substantially flush relation. The hook, F, of one member, A, fits loosely in the slot, $e$, of an adjacent member, B, and below the coupling bar, $e'$, the beak, $f'$, of said hook fitting in the slot, $g$, whereas the shank, $f$, of said hook slips or fits over the side bar, $e^2$, and the stud, $h$, of the member, B, enters loosely into the opening, $h'$, of the member, A. The side bar, $e^2$, of the member, B, is received loosely in the opening or space back of the shank, $f$, of the hook of the member, A, see Fig. 3. It will be observed that the beak, $f'$, of the hook, F, is exposed through the ribbed face of each member when they are coupled, and said members have a plurality of points of contact or bearing on the surface of a pavement or roadway. The prongs, $f^2$, $f^3$, on the hook of each member fit loosely into the channel, $d$, on the inner surface of the next member while the under surface of the hook is substantially flush with the lip, $d^2$, and the ribs, $d'$. The hooks, F, couple the members flexibly together so that they can have a limited sidewise movement, and a rocking or twisting movement, without the possibility of accidental separation, because the hooks fit around the coupling bar, $e'$, and the prongs of said hooks prevent the parts from twisting to such an extent as to uncouple them.

The number of members are coupled together in the manner described to form a protector which is adapted to extend around the tread of a tire. When using the protector in connection with an inflated tire, it is preferred to partly deflate the tire, then adjust the protector around said tire while so deflated, connect the end members of the protector one to the other in order that the said protector may fit loosely around a tire, and thereafter inflate the tire, in order to make the protector fit snugly on said tire. It is not necessary to employ fastenings for holding the protector on the tire because the inflation of said tire binds the tire and protector firmly together.

Each member of the protector extends partly around the tire transversely thereof, and said members practically conform to the arcuate cross sectional form of the tire tread. It is evident that the protector can be easily fitted to a tire, and that the members of said protector may be readily coupled together or uncoupled in case one or more of the members becomes broken or injured.

An important advantage secured by my protector is that it prevents a wheel from slipping on a muddy or sleet covered surface of a pavement, roadway, etc. The rib, C, on each member secures the necessary traction between the protector and the road surface, and this rib is also advantageous in preventing the wheels from sliding should they strike a rail of a car track a sidewise or glancing blow, for the reason that the edge of the rib, C, will bite on the edge of a rail.

It is to be understood that my protector may be used on solid rubber or other tires as well as on inflatable tires. The connected members composing the protector may be placed tightly on a solid tire, and, if desired, suitable means, such as bolts or clips, may be used for holding the protector against displacement on such a tire.

Having thus fully described the invention, what I claim as new, and desire to secure by Letters Patent is:

1. A tire protector comprising a series of unitary members adapted to be positioned against the surface of a tire in a direction transverse to the circumferential curvature thereof, each member being provided between the side and end edges thereof with a thickened portion which produces a plane tread surface on the exterior of the member, a hook positioned between the ends of each member and extending beyond a side edge thereof, and a slot in each member positioned for engagement with the hook on an adjacent member, whereby the members are flexibly and detachably coupled in series.

2. A tire protector comprising a series of unitary members adapted to be positioned against the surface of a tire transverse to the circumferential curvature thereof, that part of each member between the ends thereof being increased in thickness to produce a plane tread surface exteriorly of the member, a hook positioned on each member between the ends thereof, said hook extending beyond the side edge of the member, and a slot in each member positioned at the opposite side edge from the hook, the length of said slot exceeding the width of the hook whereby the hooks enter the slots of the members to detachably couple the members in series and to enable a certain amount of lost motion to take place between said members.

3. A tire protector comprising a series of unitary members adapted to be positioned against the surface of a tire transverse to the circumferential curvature thereof, the middle portion of each member being of greater thickness than the end portions, thereby producing a plane tread surface, the exterior of which tread surface is roughened for increasing the tractive effect of the protector, a hook positioned on each member between the ends thereof, and a slot in each member positioned to receive the hook on an adjacent member, said hooks fitting loosely in the slots to permit the members to have a limited edgewise movement and a rocking lateral movement relative to each other.

4. A tire protector comprising a series of unitary members adapted to be positioned against the surface of a tire transverse to the direction of the circumferential curvature thereof, each member being provided on one side thereof with a hook which extends outwardly from said member at a point intermediate the ends thereof, and each member being further provided with a slot, said slot being positioned adjacent to the opposite side of the member and intermediate the ends thereof, said hook of one member fitting loosely in the slot of an adjacent member and said hook coupling the two members loosely together for permitting a limited twisting movement of said coupled members relative to each other.

5. A tire protector embodying a series of unitary members, and coupling means for loosely connecting said members intermediate the end portions thereof, said coupling means coöperating to secure a limited lost movement between said members and permitting a twisting movement of one member relative to the adjacent members.

6. A tire protector comprising a series of unitary members, the inner surface of each of which is substantially curved in the direction of the length of said member, whereby the members are adapted to be positioned against the surface of a tire transversely to the direction of the circumferential curvature thereof, each being provided with a plurality of longitudinal slots positioned to form a coupling bar intermediate said slots, and provided, also, with a coupling hook adapted to extend through one slot and to fit part way around the coupling bar of an adjacent member.

7. A tire protector comprising a series of unitary members, the inner surface of each of which is substantially curved in the direction of the length of said member, whereby the members are adapted to be positioned against the surface of a tire transversely to the direction of the circumferential curvature thereof, each member being provided intermediate its ends with a plurality of longitudinal slots forming a coupling bar intermediate said slots, and a coupling hook positioned on each member intermediate its ends and extending beyond one side edge thereof, said coupling hook being offset relative to the tread surface of the member, whereby the hook is adapted to pass through one slot and to fit around the coupling bar of an adjacent member.

8. A tire protector comprising a series of unitary members, the inner surface of each of which is substantially curved in the direction of the length of said member, whereby the members are adapted to be positioned against the surface of a tire transversely to the direction of the circumferential curvature thereof, each member being provided intermediate its ends with a thickened portion producing a plane tread surface, a plurality of longitudinal slots in each member, one of said slots being wider than the other and said slots producing a coupling bar intermediate them, and a coupling hook projecting from one side edge of each member, said hook being adapted to pass through the wide slot of an adjacent member and to fit around the coupling bar.

9. A tire protector comprising a series of curved unitary members each provided intermediate the ends with a thickened portion which produces a tread, the tractive face of which is a plane surface, each member being provided, also, with a plurality of slots positioned to produce a coupling bar, and a coupling hook extending from one side edge of each member, said hook being offset from the plane of the tread surface, whereby the hook is adapted to pass through one slot in, and to fit around the coupling bar of an adjacent member to connect said members detachably and flexibly together.

10. A tire protector comprising a series of unitary members each provided intermediate the ends thereof with a plane tread surface, the inner surface of each member being curved in the direction of the length of said member, each member being provided, also, with a plurality of slots one of which is longer than the other, and a coupling hook extending from each member, said hook being provided with a shank and a beak, the width of the beak being less than that of the shank, whereby the hook of one member is adapted for the shank and beak thereof to occupy the respective slots of an adjacent member.

11. In a tire protector, a member provided with a plurality of slots, one of which is wider than the other, and a coupling hook embodying a shank and a beak, the width of the shank being less than the length of the wider slot, the hook and the beak of the coupling hook on one member being positioned to enter the wide and narrow slots, respectively, on a complemental member.

12. In a tire protector, a member provided with a flat tread surface, a shank the exposed surface of which is in the plane of said tread surface, a hook offset from the plane of the shank and the tread surface, said hook having a beak, and said member also having a plurality of slots, one of which is wider and longer than the other slot.

13. In a tire protector, a unitary member provided with a flat tread surface, a plurality of longitudinal slots spaced to produce a coupling bar intermediate them, one of said slots being longer than the other slot, and a coupling hook extending from a side edge of said member, said hook having at one end a pronged beak and at its other end a shank, the width of said shank exceeding the width of the hook and the beak.

14. In a device of the class described, a plurality of members each having two slots and a hook provided with a beak, the hook of one member fitting over a part of an adjacent member, and, also, in one slot thereof, the beak of said hook entering the other slot of said adjacent member.

15. In a tire protector, a plurality of members, each member having near one side a plurality of slots, and provided on its opposite side with a hook, said hook having a pronged beak, the hook of one member being adapted to pass through one slot and the beak being adapted to fit in the other slot of an adjacent member.

16. In a tire protector, a one-piece member provided with parallel slots and with a coupling bar intermediate said slots, and a pronged hook extending from one side of the member, the width of the pronged end of said hook exceeding the length of the slots, said hook of one member being adapted to pass through one slot in, and to fit around the coupling bar of, another member.

17. A tire protector embodying a series of unitary members each provided with a slot and a hook, said slot and the hook being positioned substantially centrally of the member, at the respective edges thereof, and said hook of one member fitting into the slot of an adjacent member and constituting a single loose connection between two adjacent members, said hook having a loose engagement and permitting a twisting movement of one member relative to the other members.

18. In a device of the class described, a one-piece curved member having on its inner side a channel, a rib on its outer surface, a slot in the rib opening into said channel, another slot adjacent to the rib, and a pronged coupling hook extending from a side of the member.

19. In a tire protector, a member provided with a slot near one edge, a hook extending outwardly from the opposite edge, said hook having an aperture at a point close to the edge of the member, and a stud projecting from the member adjacent the slot thereof, the stud of one member being adapted to enter the aforesaid opening in the hook of an adjacent member when said members are coupled by the hook.

In testimony whereof I have signed my name to this specification in the presence of two subscribing witnesses.

CHARLES A. PETTIE.

Witnesses:
H. T. BERNHARD,
V. E. NICHOLS.

Copies of this patent may be obtained for five cents each, by addressing the "Commissioner of Patents, Washington, D. C."